US 7,095,732 B1

United States Patent
Watson, Jr.

(10) Patent No.: US 7,095,732 B1
(45) Date of Patent: Aug. 22, 2006

(54) QUALITY OF SERVICE BASED MEDIA ACCESS CONTROL FOR MOBILE AD HOC NETWORKS

(75) Inventor: William Dugald Watson, Jr., Pepperell, MA (US)

(73) Assignee: BBN Technologies Corp., Cambridge, MA (US)

( * ) Notice: Subject to any disclaimer, the term of this patent is extended or adjusted under 35 U.S.C. 154(b) by 1000 days.

(21) Appl. No.: 10/122,438

(22) Filed: Apr. 12, 2002

(51) Int. Cl.
*H04J 3/16* (2006.01)

(52) U.S. Cl. ........................................ 370/346; 370/458

(58) Field of Classification Search ................ 370/229, 370/235, 346, 312, 349, 400, 389, 376, 395.21, 370/395.4, 395.42, 449, 458
See application file for complete search history.

(56) References Cited

U.S. PATENT DOCUMENTS

| | | | | |
|---|---|---|---|---|
| 5,832,197 A | * | 11/1998 | Houji ........................... | 714/4 |
| 5,995,503 A | * | 11/1999 | Crawley et al. ............. | 370/351 |
| 6,813,272 B1 | * | 11/2004 | An et al. ................ | 370/395.21 |
| 2003/0076829 A1 | * | 4/2003 | Rabie et al. ................ | 370/391 |

OTHER PUBLICATIONS

Frank, Alan R., "QoS Coming to IEEE 802.11 Wireless LANs," CommWeb.com, http://www.commweb.com/article/COM20010226S0001, Feb. 26, 2001, pp. 1-3.

* cited by examiner

*Primary Examiner*—Brenda Pham
(74) *Attorney, Agent, or Firm*—Fish & Neave IP Group, Ropes & Gray LLP (57) ABSTRACT

A manager node (105) controls access to a shared network communication medium by a number of nodes. A first node (101) transmits a request to the manager node (105). The request includes information indicating that the first node (101) requires a QoS link to a second node. The manager node (105) determines whether the QoS link from the first node (101) to the second node can be supported and sends an accept message to the first node (101) when the QoS link can be supported. Prioritized media access control may also be used in a distributed network without using a manager node to control access to a shared communication medium. A node with high priority data may reduce the duration of its contention window so that it will have a better chance of gaining control of the shared communication medium than a node with low priority data.

49 Claims, 7 Drawing Sheets

QUALITY OF SERVICE BASED MEDIA ACCESS CONTROL FOR MOBILE AD HOC NETWORKS

BACKGROUND OF THE INVENTION

1. Field of the Invention

The present invention relates generally to networks and, more particularly, to quality of service, contention-based media access control for mobile ad hoc networks.

2. Description of Related Art

The use of ad hoc wireless networks has increased in recent years. An ad hoc wireless network typically includes several wireless, usually mobile, nodes. In such a network, each of the nodes may be equipped with a radio that allows the node to communicate with other nodes to form a network. The nodes typically include a media access controller (MAC) that determines when data can be sent via radio waves to another node. The MAC algorithm that determines the appropriate times to send data is often very complex.

MAC algorithms generally fall into two broad categories: centralized and decentralized. In a mobile ad hoc environment, the infrastructure associated with the network is not guaranteed. Therefore, decentralized algorithms are typically used. Within the decentralized category, there are two general types of MAC algorithms: schedule-based and contention-based.

Schedule-based algorithms are time-oriented techniques in which each node knows when it is time to transmit. This requires time synchronization and decentralized coordination throughout the network to ensure that time slot information is consistent across the network. This is cumbersome and requires considerable overhead at the MAC layer in order to operate properly. Such a technique is also sub-optimal for bursty data.

Contention-based algorithms are channel-oriented techniques in which each node senses the state of the channel. In this technique, a node waits for the channel to be sensed as clear and then transmits its data. This technique may be optimal for bursty data, but is sub-optimal for quality of service (QoS) based data.

Another problem in conventional ad hoc networks is that nodes typically have equal access to the shared communication medium. This causes problems when a node wishes to transmit high priority data and is unable to seize the shared communication medium.

Therefore, a need exists for systems and methods that enable nodes to perform QoS, contention-based media access control in a wireless network that efficiently supports both bursty and non-bursty traffic. A need also exists for systems and methods that enable nodes to gain access to a shared communication medium based on data priority.

SUMMARY OF THE INVENTION

Systems and methods consistent with the present invention address these and other needs by using a manager node that generates a QoS polling cycle in response to QoS-based requests for network access. When a QoS-based request can be fulfilled, the polling cycle reserves a time slot for the requesting node to transmit data. Systems and methods consistent with the present invention also provide a mechanism for prioritized access to the shared communication medium. Nodes with higher priority data are given a greater probability of being able to transmit data before nodes with lower priority data by adjusting their respective contention windows based on the type of traffic.

In accordance with the principles of the invention as embodied and broadly described herein, a method is provided that includes generating a request at a first node, where the request includes information indicating that the first node requires a QoS link to a second node. The method also includes transmitting the request from the first node and receiving the request at a third node, where the third node represents a manager node. The method further includes determining, by the third node, whether the QoS link from the first node to the second node can be supported and sending an accept message from the third node to the first node when the QoS link can be supported.

In another implementation consistent with the present invention, a first node includes a receiver configured to receive a request from a second node, the request including information indicating that the second node requires a QoS link to a third node. The first node also includes a processing device configured to determine whether the QoS link from the second node to the third node can be supported, generate a polling cycle, and reserve a time slot for the second node in the polling cycle when the QoS link can be supported. The first node further includes a transmitter configured to transmit an accept message to the second node when the QoS link can be supported.

In still another implementation consistent with the present invention, a computer-readable medium having stored sequences of instructions is provided. The instructions cause a processor to generate a request indicating that a first node requires a QoS link to a second node, where the first node is associated with the processor. The instructions also cause the processor to transmit the request to a third node, the third node representing a manager node for a number of nodes including the first node. The instructions further cause the processor to receive at least one of an accept message and a deny message from the third node, the accept message indicating that the QoS link can be supported and the deny message indicating that the QoS message cannot be supported.

In a further implementation consistent with the present invention, a method for accessing a shared communication medium includes broadcasting a message from a first node to other nodes via the shared communication medium. The message identifies a link that the first node wishes to establish with a second node and includes a priority associated with the link. The method also includes receiving the message at each of the other nodes. The method further includes adjusting, by the first node, a contention window interval based on the priority included in the message.

In still another implementation consistent with the present invention, a computer-readable medium having stored sequences of instructions is provided. The instructions cause a processor to generate a request, the request indicating that a first node wishes to establish a link over a shared communication medium with a second node. The processor is associated with the first node and the request includes a priority associated with the link. The instructions also cause the processor to adjust a contention window interval based on the priority included in the request. The instructions further cause the processor to broadcast the request to a number of nodes including the second node.

In yet another implementation of the present invention, a first node includes a receiver configured to receive a broadcast message from a second node. The first node also includes a processing device configured to determine that the broadcast message indicates that the second node wishes to establish a link over a shared communication medium. The processing device is also configured to identify a priority associated with the link and adjust a contention window interval based on the priority.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention perform contention-based media access control in ad hoc wireless networks by allowing nodes to transmit a QoS request to a manager node. When the request is granted, the QoS manager may reserve a slot in a polling cycle for the requesting node. Systems and methods consistent with the present invention may also perform prioritized media access control in which higher priority data is more likely to get on the channel than lower priority data. This enables an ad hoc wireless network to transmit data through the network in a more efficient manner with less contention problems.

Exemplary Network

Figure 1:
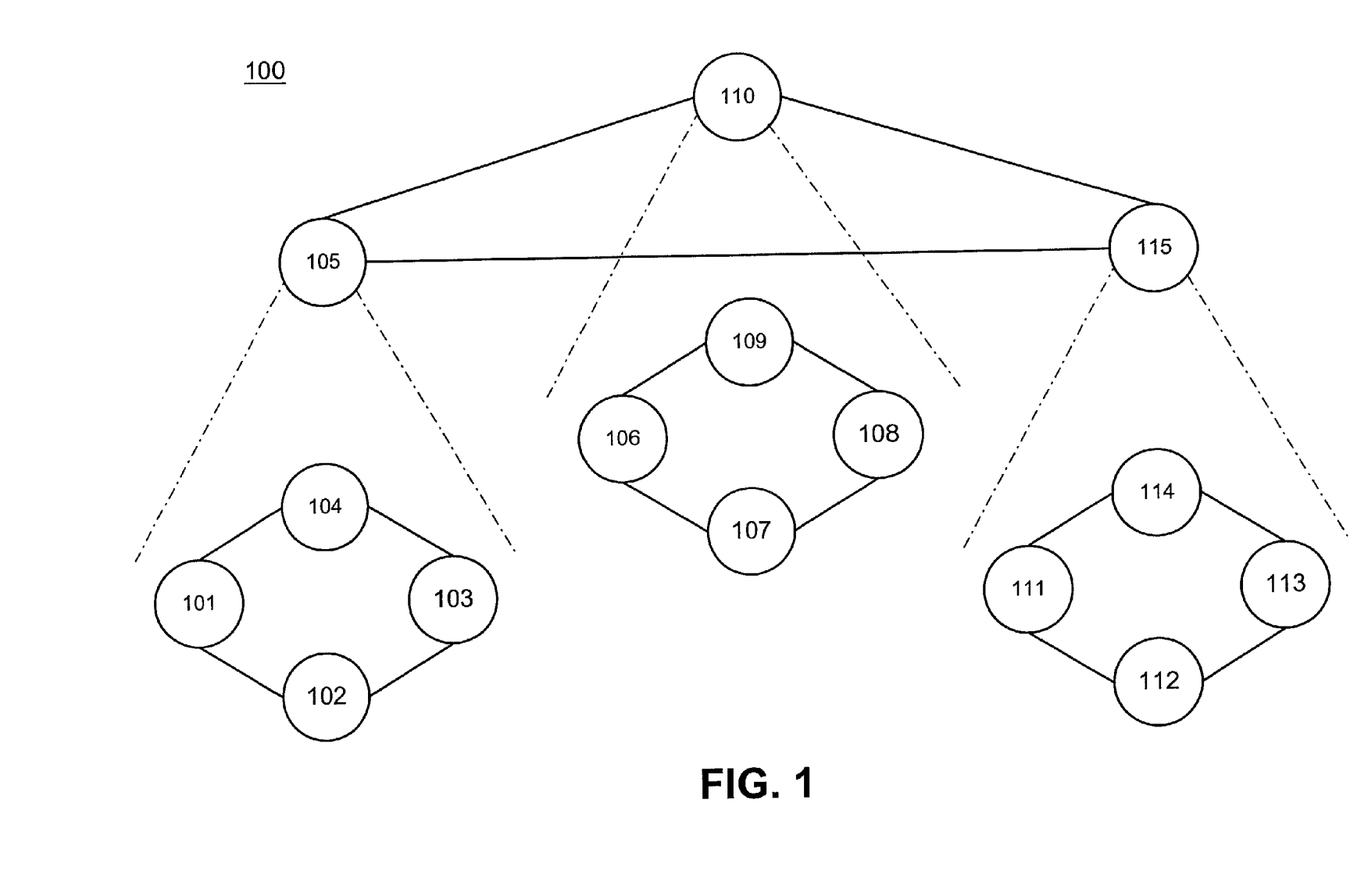
FIG. 1 is a diagram of an exemplary network in which systems and methods consistent with the present invention may be implemented.

FIG. 1 is a diagram of an exemplary network 100 in which systems and methods consistent with the present invention may be implemented. Each of the circles in FIG. 1 represents a node and each of the nodes may communicate with neighboring nodes via radio frequency (RF) communication paths or links. The solid lines connecting the nodes represent "neighbor relations" between nodes (i.e., a line represents a possible path by which data messages can flow between nodes in network 100). The neighbor relations may be formed using, for example, conventional beaconing techniques.

Network 100 includes nodes 101–115 organized in a hierarchical fashion. For example, nodes 105, 110 and 115 may function as QoS managers in network 100, as described in more detail below. More specifically, node 105 may function as a QoS manager for nodes 101–104, node 110 may function as a QoS manager for nodes 106–109 and node 115 may function as a QoS manager for nodes 111–114, as indicated by the dotted lines in FIG. 1.

The QoS manager nodes 105, 110 and 115 may communicate with nodes 101–104, 106–109 and 111–114, respectively, and vice versa, as described in more detail below. It should be noted that nodes 105, 110 and 115 are shown in FIG. 1 as having neighbor relations with their respective subordinate nodes 101–104, 106–109 and 111–114, as represented by the dashed lines.

Nodes 105, 110 and 115 may also communicate with each to form a backbone in network 100 and may represent gateways in network 100. Similarly, nodes 101–104, 106–109 and 111–114 are illustrated as being neighbors in network 100 (i.e., these nodes have formed neighbor relations using, for example, beaconing techniques). The exemplary neighbor relations shown in FIG. 1 are for simplicity. It should be understood that other neighbor relations may be formed in network 100.

Exemplary Node

Figure 2:
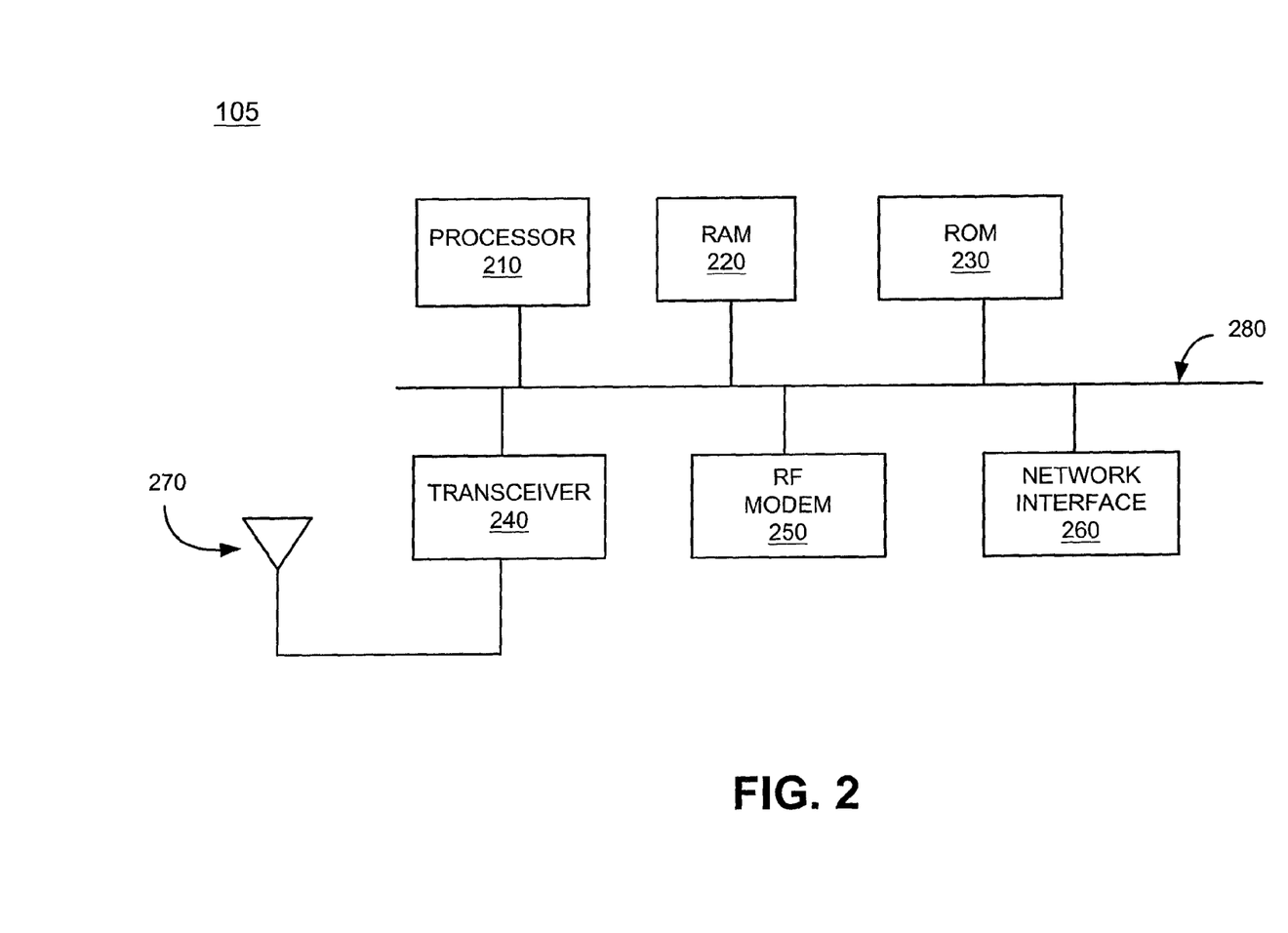
FIG. 2 is a diagram of an exemplary node of FIG. 1 according to an implementation consistent with the present invention.

FIG. 2 is a diagram of an exemplary node of FIG. 1, such as node 105, according to an implementation consistent with the present invention. Node 105 may include a processor 210, a random access memory (RAM) 220, a read only memory (ROM) 230, a transceiver 240, an RF modem 250, a network interface 260 and an antenna 270. These components may be connected via one or more buses, illustrated as bus 280 for simplicity. Nodes 101–104 and 106–115 may be configured in a similar manner.

Processor 210 may include any type of conventional processor or microprocessor that interprets and executes instructions. RAM 220 may include a conventional RAM or another type of dynamic storage device that stores information and instructions for execution by processor 210. ROM 230 may include a conventional ROM device or another type of static storage device that stores static information and instructions for use by processor 210. Instructions used by the processor 210 may also, or alternatively, be stored in another type of computer-readable medium. A computer-readable medium includes one or more memory devices and/or carrier waves.

Transceiver 240 may include conventional components for transmitting and receiving data. For example, transceiver 240 may include one or more conventional transceivers for transmitting and receiving RF data via antenna 270. In other implementations, transceiver 240 may be configured as separate transmit and receive modules.

RF modem 250 may include one or more conventional modems that convert analog signals to digital signals, and vice versa, for communicating with other devices in node 105, such as processor 210 and transceiver 240. Transceiver 240 and RF modem 250 form a wireless network interface that operate under the control of processor 210 for transmitting and receiving data packets via antenna 270.

Network interface 260 may include an interface that allows node 105 to be coupled to an external network. For example, network interface 260 may include a serial line interface, an Ethernet interface, an asynchronous transfer mode (ATM) network interface, an interface to a local area network (LAN), etc.

Antenna 270 may each include one or more conventional antennas capable of transmitting and receiving RF signals. In accordance with an exemplary implementation, antenna 270 may be an omni-directional antenna or a directional antenna.

One skilled in the art would recognize that node 105 may be configured in a number of other ways and may include other components. For example, node 105 may include a different number of antennas and transceivers. In addition, node 105 may include a power supply, such as a battery, fuel cell or the like, for providing power to the components of the node 105. In some implementations, the power supply includes a recharging mechanism to permit the battery to be recharged using, for example, solar power techniques.

Node 105, consistent with the present invention, controls access to a wireless communication channel in response to processor 210 executing sequences of instructions contained in a computer-readable medium, such as RAM 220. Such instructions may be read into RAM 220 from another computer-readable medium, such as ROM 230 or an external data storage device (not shown) via a communication interface, such as network interface 260.

Execution of the sequences of instructions causes processor 210 to perform the acts that will be described hereafter. In alternative embodiments, hard-wired circuitry may be used in place of or in combination with software instructions to implement aspects of the present invention. For example, in alternative embodiments, the processor 210 and/or other components of node 105 may be implemented as an application specific integrated circuit (ASIC), a number of field programmable gate arrays (FPGAs) or one or more digital signal processors (DSPs). Thus, the present invention is not limited to any specific combination of hardware circuitry and software.

QoS-Based Polling

Figure 3:
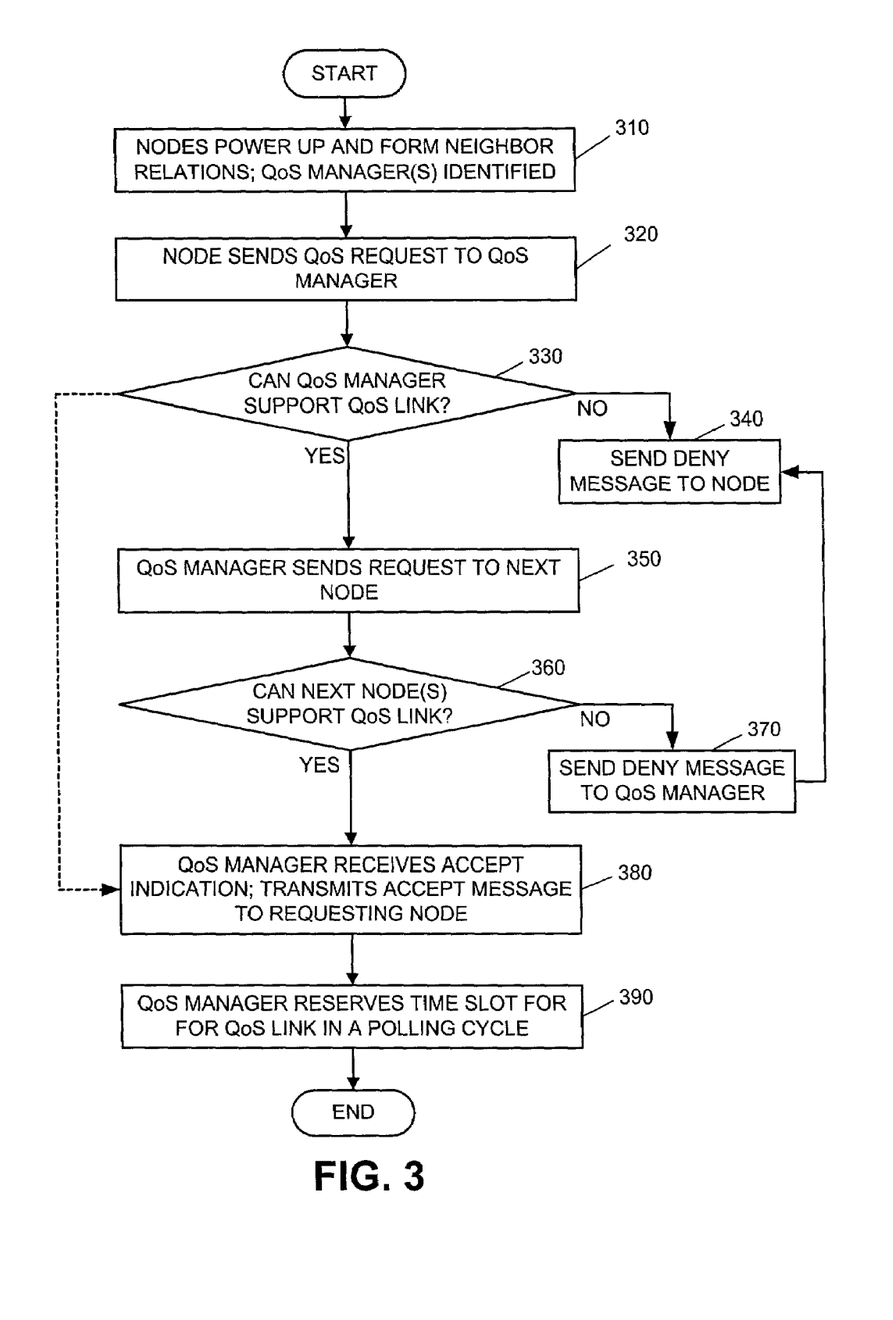
FIG. 3 is a flow diagram consistent with the present invention illustrating exemplary processing by nodes in the network of FIG. 1.

FIG. 3 is a flow diagram of processing by nodes in network 100 in an exemplary implementation consistent with the present invention. Processing may begin when the nodes in network 100 power up and form neighbor relations (act 310). As described previously, nodes in network 100 may perform neighbor discovery using beaconing to detect their neighboring nodes. Assume that nodes 105, 110 and 115 in network 100 are configured to act as QoS managers in network 100. For example, nodes 105, 110 and 115 may include more radios (i.e., transceivers 240) and antennas 270 or better radios/antennas than the other nodes in network 100 that enable them to act as QoS managers. Alternatively, the QoS managers may be assigned based on degree or connectivity of the nodes. That is, a node that effectively acts as a gateway to other nodes may be assigned to be the QoS manager. For example, nodes 105, 110 and 115 effectively act as gateways for nodes 101–104, 106–109 and 111–115, respectively, as shown in FIG. 1, and may be assigned to be the QoS managers. In any event, nodes 105, 110 and 115 may transmit beacon messages to the other nodes indicating that they will act as QoS managers for QoS traffic.

Assume that a node, such as node 101, wishes to establish a QoS link with another node (i.e., node 101 wants to send QoS-based data to another node). A QoS link requires that the communication channel between the sending and destination nodes meets certain throughput requirements. Such throughput requirements may be specified in a QoS request message. Node 101 may send a QoS request to its QoS manager (act 320). In the configuration illustrated in FIG. 1, node 105 acts as the QoS manager for node 101 and, therefore, node 101 sends the QoS request to node 105. Node 105 (also referred to as QoS manager 105) determines whether it can support this QoS link (act 330).

For example, the QoS request from node 101 may indicate that a particular amount of bandwidth associated with a voice call is needed. In this case, the QoS manager 105 may determine whether it can support the requested bandwidth. If the QoS manager 105 cannot support the request, QoS manager 105 sends a deny message to the requesting node, i.e., node 101 (act 340). If, however, QoS manager 105 can support the QoS link and QoS manager 105 is not the destination node for the QoS data, QoS manager 105 sends a request to the next node to determine whether the next node can support the QoS link (act 350). The next node may represent the destination node or the next hop in the path to the destination node.

For example, if the destination node for the QoS-based data is node 103, node 105 sends a request to node 103 to determine if node 103 can support the QoS link. If, however, the destination node is node 108, node 105 may forward the request to node 110, the QoS manager for node 108. Alternatively, node 105 may forward the request directly to node 108, if a neighbor relation has been formed between nodes 105 and 108.

In either case, the next node may then determine whether it can support the QoS link (act 360). If the next node cannot support the QoS link, it sends a deny message to QoS manager 105 (act 370). In addition, if the next node is not the destination node, the next node forwards the QoS request to the succeeding next node in the data path until the destination node is reached. For example, in the scenario above in which node 108 is the destination node, node 105 may transmit the request to node 110 and node 110 may transmit the request to node 108. Node 108 may then determine whether it can support the QoS link.

In summary, if any of the hops, up to and including the destination node, cannot support the QoS link, that node sends a deny message to the previous hop until it reaches the QoS manager 105 associated with the original requesting node 101. The QoS manager 105 may then send a deny message to node 101 (act 340). If the next node and all the nodes up through the destination node can support the QoS link, the QoS manager 105 receives an accept indication (act 380). In an exemplary implementation, each node in the path from the destination node to QoS manager 105 may transmit an accept indication to the previous node in the path until the accept indication reaches QoS manager 105. QoS manager 105 may then generate and transmit an accept message to the requesting node, i.e., node 101 (act 380).

Alternatively, if QoS manager 105 is the destination node and QoS manager 105 can support the QoS link (act 330), QoS manager 105 transmits an accept message to node 101, bypassing acts 340–370, as indicated by the dashed line in FIG. 3 (act 380). It should also be noted that if the destination node is a node 1-hop from requesting node 101 (e.g., node 102), the QoS manager 105 may merely have to forward the QoS request to the destination node to determine whether that node can support the QoS link. That is, the QoS manager 105 may not be included in the data path for the QoS-based data in this case, as described in more detail below, and therefore, may not have to support the QoS link.

After QoS manager 105 determines that the QoS link can be supported, the QoS manager 105 reserves a time slot for the QoS link in a QoS polling cycle (act 390). FIGS. 4A–4D illustrate exemplary timing diagrams associated with transmitting data in network 100, consistent with the present invention, which includes a QoS period and a distributed control function (DCF) period.

Figure 4A:
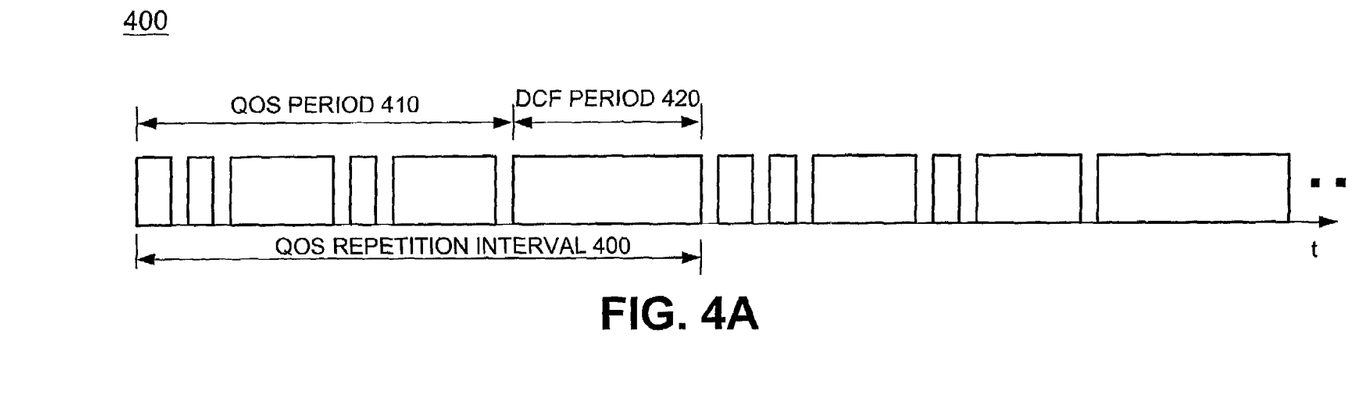
FIGS. 4A–4D illustrate exemplary timing diagrams consistent with the present invention associated with transmitting data in the network of FIG. 1.

Referring to FIG. 4A, a QoS repetition interval 400 includes QoS period 410 and DCF period 420, which may be repeated over time. Each QoS manager controls the QoS period 410 based on requests it receives from its subordinate nodes and, possibly, other neighboring nodes. For example, QoS manager 105 controls QoS period 410 based on requests received from nodes 101–104. QoS manager 105 may alter the QoS period 410 to include additional polling intervals when a request is made and the corresponding QoS link can be supported, as described above in relation to FIG. 3. It should also be understood that each of the QoS managers 105, 110 and 115 may have a different QoS repetition interval, based on the particular requirements associated with its corresponding subordinate nodes.

Figure 4B:
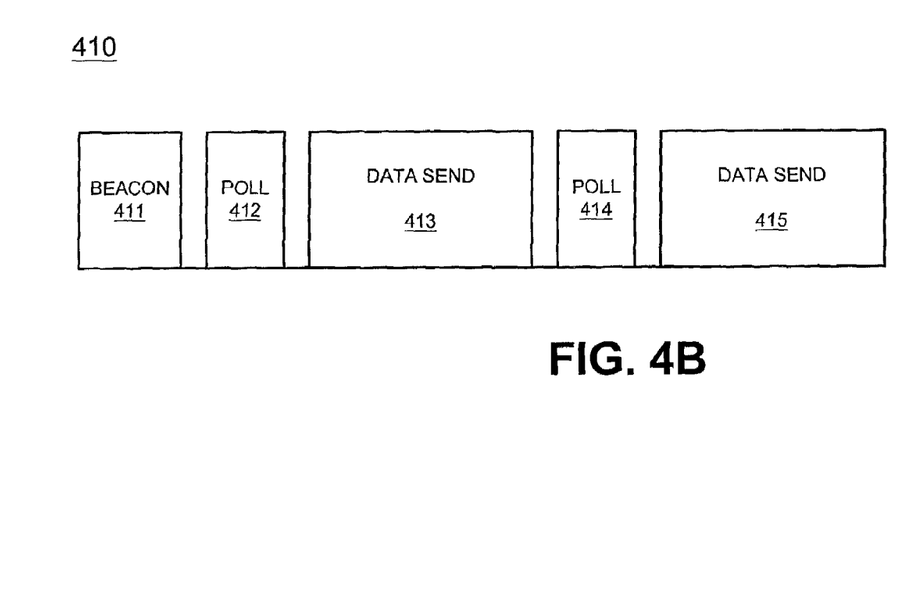

FIG. 4B illustrates an exemplary QoS period 410 in more detail. Referring to FIG. 4B, the QoS period 410 includes a beaconing interval 411, two polling intervals 412 and 414 and two data sending intervals 413 and 415. The beaconing interval 411 may represent the period of time in which QoS manager 105 broadcasts a beacon to nodes 101–104 to inform these nodes that it will act as QoS manager. The beacon may also be received by other nodes in network 100, such as nodes 110 and 115.

The first polling interval 412 may represent a polling interval reserved for a node that has requested a QoS link and received an acceptance message by the QoS manager 105, as described previously with respect to FIG. 3. For example, polling interval 412 may represent a polling interval reserved for node 101 and polling interval 414 may represent a polling interval reserved for node 102. In this case, QoS manager 105 has received and accepted QoS link requests from nodes 101 and 102 in the manner described with respect to FIG. 3. Data sending intervals 413 and 415 may represent the transmission of data blocks from nodes 101 and 102, respectively. During these data sending intervals, the other nodes remain quiet.

Figure 5:
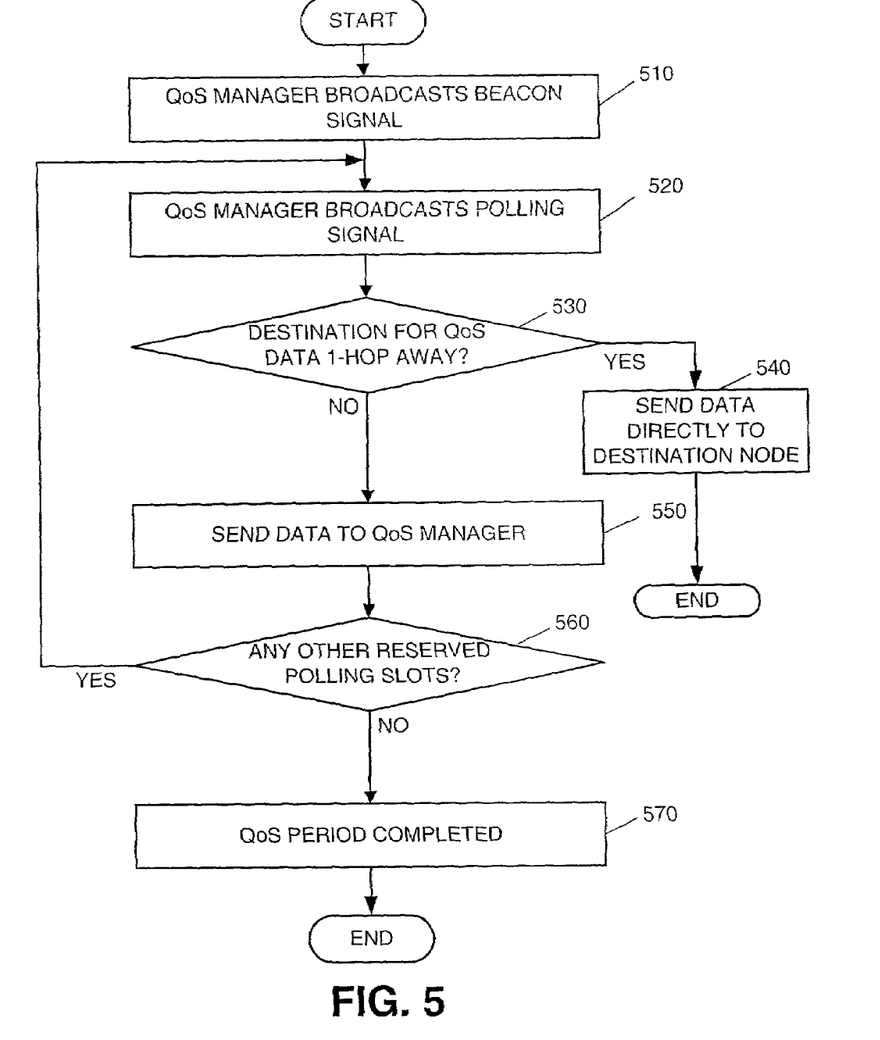
FIGS. 5 and 6 are flow diagrams consistent with the present invention illustrating exemplary processing associated with transmitting data in the network of FIG. 1.

FIG. 5 illustrates exemplary processing associated with transmitting data during QoS period 410 of FIG. 4B, consistent with the present invention. Processing may begin with QoS manager 105 broadcasting a beacon signal (act 510). The beacon may be broadcast at full power to alert other nodes in network 100 as to the existence of node 105 and may include information identifying node 105 as a QoS manager. QoS manager 105 may then broadcast a first polling signal in a polling cycle to nodes 101–104 (act 520). For example, the first polling signal may identify node 101 and indicate that the next data sending interval is reserved for node 101. Nodes 102–104 receive this polling signal and remain quiet (i.e., do not transmit data) during the following data sending interval.

Node 101 may then transmit its QoS data during data sending interval 413. According to an exemplary implementation of the present invention, the sending node (i.e., node 101) may determine if the destination for the data is 1-hop from the sending node (act 530). Node 101 may access a table in its memory to determine if the destination node is 1-hop away. If the destination for the data is 1-hop away, node 101 may send the data directly to the destination node (act 540). If the destination is more than 1-hop away, node 101 may send the data to QoS manager 105 (act 550). For example, referring to FIG. 4B, node 101 may forward data to QoS manager 105 during interval 413. In this case, if the QoS manager 105 is not the destination node, QoS manager 105 forwards the QoS data to the next hop.

QoS manager 105 may then determine whether any additional nodes have reserved polling slots in QoS period 410 (act 560). If no additional polling slots are reserved, the QoS period 410 is completed (act 570). If, however, additional polling slots have been reserved for particular nodes, processing may then return to act 520. Referring back to the exemplary QoS period 410 in FIG. 4B, QoS manager 105 broadcasts another polling signal to nodes 101–104 at polling interval 414. This signal identifies, for example, node 102 and indicates that the next data sending interval is reserved for node 102. Nodes 101, 103 and 104 receive this polling signal and remain quiet during the following data sending interval. Node 102 may then transmit its QoS data during data sending interval 415. For example, the data from node 102 may be destined for node 103. In this case, since the destination is 1-hop from the sending node, node 102 may send the data directly to node 103 and bypass node 105, thereby saving time and network resources.

The exemplary processing described above defines an exemplary QoS period 410. As described previously, the QoS period 410 may be changed as additional QoS link requests are made and are granted. QoS period 410 may also change when QoS links are no longer needed. That is, when a node no longer requires a QoS link, that node can transmit a QoS release message to its QoS manager, which then can delete the slot in its polling cycle reserved for that node. In this manner, QoS manager 105 efficiently controls data transfer from its subordinate nodes (i.e., nodes 101–104) by establishing a polling cycle to control data transmissions in network 100.

The QoS repetition interval in FIG. 4A also includes a distributed control function (DCF) period 420. As described above, polling may be used when a number of nodes are neighbor nodes of a QoS manager node. When such a configuration does not exist, a DCF mechanism may be used to avoid contention problems. In accordance with an exemplary implementation of the present invention, the DCF period 420 may be prioritized as described in more detail below.

Prioritized DCF

In conventional systems that employ a DCF mechanism to control access to a shared communication channel, each node listens to the communication channel for other users. If the channel is idle, the node may transmit. If the channel is busy, however, each node must wait until transmission stops before attempting to transmit. Each node may also include a timer that times a random number of back-off time slots before attempting to transmit. In this manner, each node has equal probability of accessing the communication channel during a period of time referred to as the contention window.

Implementations of the present invention advantageously prioritize data to give certain types of data higher priority. When a node is attempting to transmit the higher priority data, that node is given a better chance of seizing the communication channel before other nodes transmitting lower priority data, as described in more detail below.

Figure 4C:
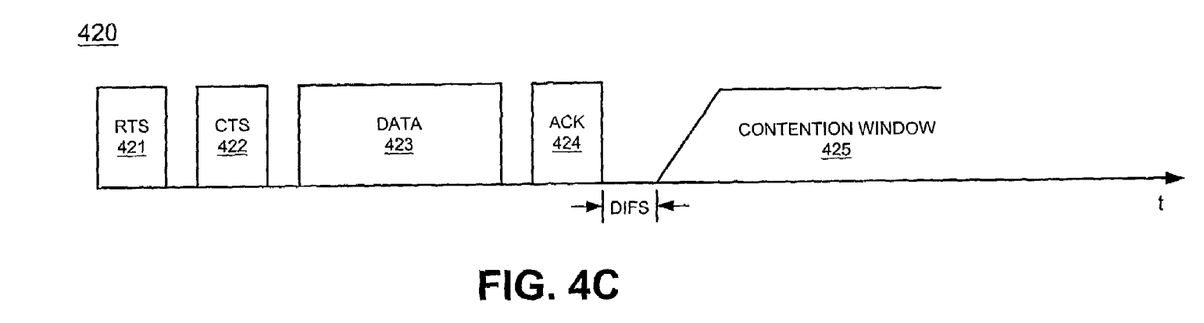

FIG. 4C schematically illustrates the DCF period 420 in more detail. Referring to FIG. 4C, the DCF period 420 includes a request to send (RTS) interval 421, a clear to send (CTS) interval 422, a data block sending interval 423, an acknowledge (ACK) interval 424 and a contention window 425. In this implementation, when a node wishes to transmit data, it broadcasts an RTS signal during interval 421. The other nodes receive this signal and the destination node transmits a CTS signal during interval 422 if the channel is clear.

The sending node may then transmit its data during interval 423 and the other nodes remain quiet (i.e., they withhold transmission). The receiving node may then transmit an ACK signal during interval 424. After the ACK interval 424, nodes in network 100 wait a predetermined period of time, known as the DCF inter-frame spacing (DIFS) interval, before attempting to seize the channel for a data transmission. After expiration of the DIFS interval, a node may attempt to seize the channel by transmitting an RTS signal. If another node has already seized the channel, the RTS may be denied (i.e., the destination node does not send a CTS signal). The contention window 425 refers to the period of time after the DIFS interval has expired that the channel is idle. During this period, each of the nodes may contend for the channel.

According to an exemplary implementation of the present invention, when a node has priority data, such as QoS-based data, the duration of the contention window 425 may be reduced. That is, the length of time between the expiration of the DIFS interval and the time when the node can transmit an RTS or other request signal is reduced from that used with lower priority traffic. In addition, when the node that is the destination for the QoS link request receives the QoS request, that node may also reduce the duration of its contention window 425. In this manner, when nodes are transmitting higher priority data, these nodes have a greater chance of being able to seize the communication channel than the other nodes.

Figure 4D:
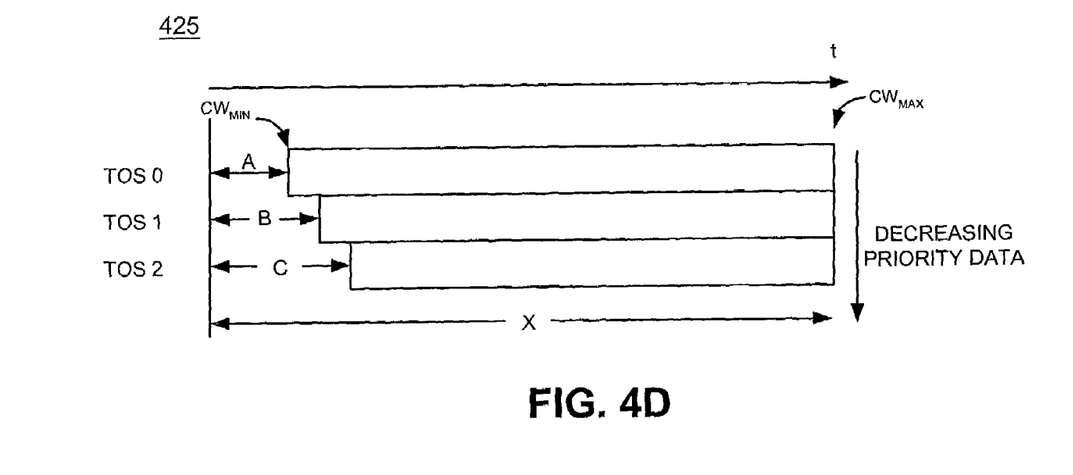

FIG. 4D schematically illustrates the contention window 425 for various types of data consistent with the present invention. For example, FIG. 4D illustrates minimum and maximum contention windows ($CW_{MIN}$ and $CW_{MAX}$) for data corresponding to various priorities. For example, type of service (ToS) refers to a value that may be used to represent various types of data traffic. According to an exemplary implementation, ToS 0 through ToS 63 may identify 64 types of service that correspond to different types of data. For example, ToS 0 may correspond to video data that is associated with a QoS request. It should be understood that the present invention may support additional types of service and corresponding ToS values.

According to the exemplary implementation of the present invention, ToS 0 represents data having the highest priority, followed by ToS 1, then ToS 2 etc. The minimum contention window (CWMIN) corresponding to ToS 0, represented by interval A in FIG. 4D, is shorter than the minimum contention window for ToS 1, represented by B in FIG. 4D. Similarly, $CW_{MIN}$ for ToS 1 is shorter than $CW_{MIN}$ for ToS 2, represented by C in FIG. 4D. This effectively gives a node with higher priority data a better chance of being able to seize the communication channel than a node with lower priority data, as described in more detail below. The maximum contention window, $CW_{MAX}$, is represented by "X" in FIG. 4D and may be equal for each ToS value.

Figure 6:
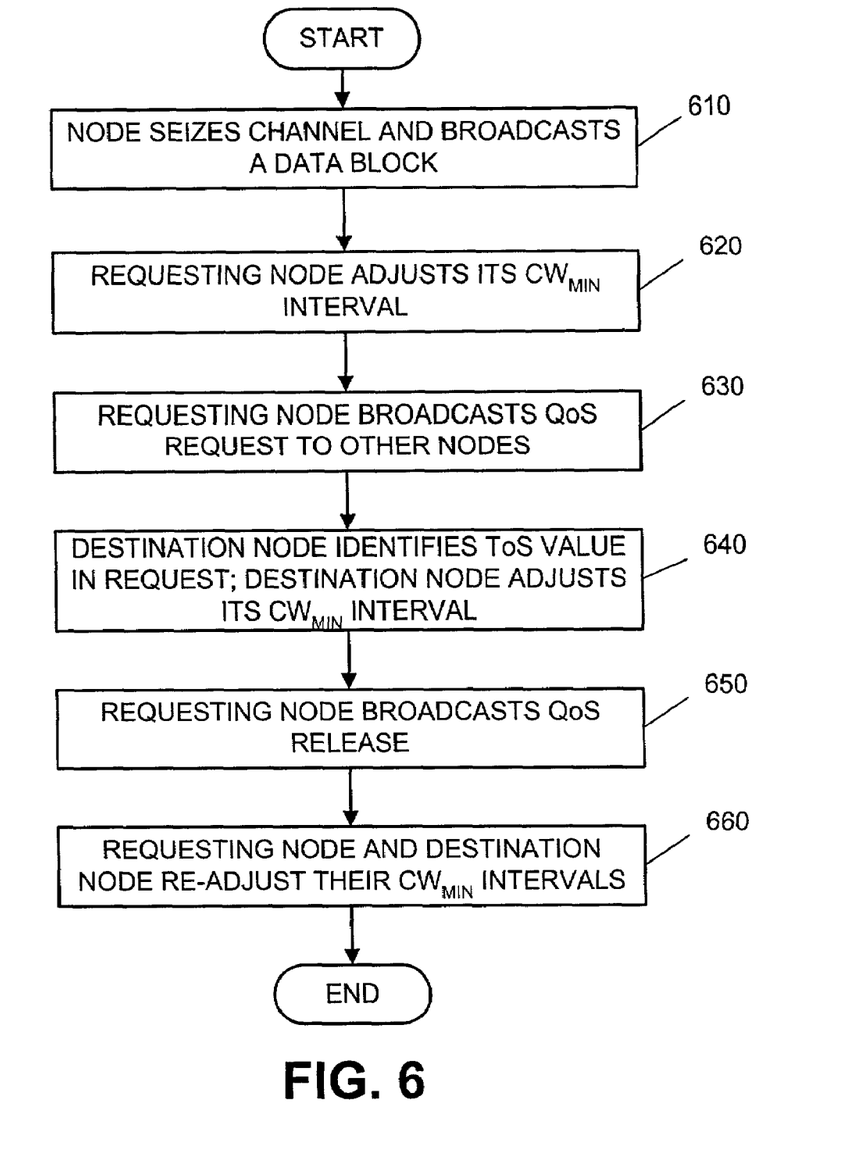

FIG. 6 is a flow diagram of exemplary processing by nodes in network 100, consistent with the present invention, illustrating prioritized DCF. The DCF period 420 (FIG. 4A) may commence upon completion of the QoS period 410. Alternatively, the DCF period 420 may exist in a network that does not include a polling cycle as illustrated in QoS period 410. That is, the DCF period 420 may be used in a network that does not have the connectivity needed to support QoS manager nodes.

In either case, processing may begin with a node seizing the communication channel and broadcasting a data block (act 610). For example, assume that node 102 wishes to send data to node 104. In this case, node 102 broadcasts an RTS signal to nodes 101 and 103–105 at RTS interval 421 (FIG. 4C). Further assume that node 104 receives the RTS and broadcasts a CTS signal at CTS interval 422 indicating that the channel is clear. Nodes 101, 103 and 105 remain quiet during the subsequent data sending interval. Node 102 may then transmit its data during interval 423. Destination node 104 receives the data block and broadcasts an ACK signal during interval 424.

After the ACK signal is broadcasted, each node waits a predetermined DIFS interval before attempting to seize the communication channel. After the DIFS interval has expired, suppose that node 101 wishes to form a QoS link with node 103 to send and receive high priority data, such as ToS 0 data. In this case, node 101 identifies the particular ToS value associated with the QoS link request and adjusts its contention window to $CW_{MIN}$, based on the ToS value included in its request (act 620). In this example, since the request is associated with ToS 0 data, node 101 may reduce its contention window to the value represented by "A" in FIG. 4D. The particular length of A may be predetermined based on a number of factors, including level of traffic in network 100. Given the guidance provided herein, one of ordinary skill in the art would be able to adjust the duration of the $CW_{MIN}$ and $CW_{MAX}$ for ToS 0–ToS 63 to optimize the data throughput in network 100 based on the particular network requirements.

Node 101 then broadcasts the QoS request to nodes 102–105 (act 630). The QoS request may include a field that identifies the particular ToS value associated with the request and the destination for the QoS link. Nodes 102–105 receive the QoS request and identify that the QoS request is intended for node 103. Node 103 identifies the particular ToS value associated with the request and adjusts its contention window to the $CW_{MIN}$ interval corresponding to the ToS value included in the request (act 640). In this example, since the request is associated with ToS 0 data, node 103 may reduce its contention window to the value represented by "A" in FIG. 4D. As described previously, the particular length of A may be chosen to optimize data throughput in network 100.

In this manner, nodes 101 and 103 reduce the duration of their contention windows to the $CW_{MIN}$ value associated with the particular ToS value. This gives these nodes a greater probability of seizing the channel to communicate higher priority data traffic between themselves over network 100. Such data traffic may include voice data transmitted between nodes 101 and 103. Alternatively, if the QoS link does not require a full duplex connection, the destination node 103 may not reduce its contention window since it will not be transmitting data back to node 101.

Nodes 102, 104 and 105 also receive the broadcast QoS request and may identify the ToS value included in the request. Nodes 102, 104 and 105 may then increase their respective contention windows to the $CW_{MAX}$ associated the particular ToS value included in the QoS request (act 650). When the other nodes (i.e., nodes 102, 104 and 105 in this example) increase their contention windows, this further increases the probability that nodes 101 and 103 will be able to seize the channel and complete a data communication. In the example above where the QoS request identifies ToS 0, nodes 102, 104 and 105 may increase the duration of their respective contention windows to the value represented by "X" in FIG. 4D.

After the QoS link is no longer needed, node 101 may broadcast a QoS release to nodes 102–105 (act 660). Nodes 101 and 103 may then release resources associated with fulfilling the throughput requirements associated with the QoS link. Nodes 101 and 103 may also return their respective contention windows back to their normal values (act 670). Nodes 102, 104 and 105 may similarly return their respective contention windows back to their normal values (act 670). The normal value of the contention window may be equal for each node, thereby giving each node an equal chance in gaining access to the communication channel.

Systems and methods consistent with the present invention perform contention-based media access control by using QoS manager nodes to control access to the shared channel. As a result, nodes are able to transmit data through the network with less contention problems. One advantage of using QoS managers is that QoS-based data may be transmitted through network with little additional overhead and non-QoS based data may be transmitted without any additional overhead. Systems and methods consistent with the present invention also allow prioritized access to the shared channel by adjusting the contention windows of the nodes in the network. This advantageously gives nodes with higher priority data a greater chance of gaining access to the shared channel.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the network 100 has been described as an ad hoc wireless network, systems and methods consistent with the present invention may be applicable to other types of networks. In addition, while series of acts have been described with respect to FIGS. 3, 5 and 6, the order of the acts may be modified in other implementations consistent with the present invention.

The present invention has also been described as using ToS values to indicate priority associated with a data transmission. In other implementations, other values may be used to indicate priority. In addition, the present invention has been described as using 64 ToS values to indicate various priority levels. In other implementations, more or fewer priority values may be used. For example, in one implementation, data may be characterized as having either a high priority or a normal/low priority.

The present invention has further been described as transmitting data via an ad hoc wireless network. It should be understood that the data transmitted may include voice data, video data or other data. It should further be understood that the data links between the nodes in network 100 may be full or half duplex links. The links may also be multipoint, conference-type links involving multiple nodes.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method, comprising:
   generating a request at a first node, the request including information indicating that the first node requires a QoS link to a second node;
   transmitting the request from the first node;
   receiving the request at a third node, the third node representing a manager node;
   determining, by the third node, whether the QoS link from the first node to the second node can be supported; and
   sending an accept message from the third node to the first node when the QoS link can be supported;
   generating, by the third node, a polling cycle;
   reserving a time slot in the polling cycle for the first node when the QoS link from the first node to the second node can be supported; and
   broadcasting polling signals based on the polling cycle, at least one of the polling signals identifying the first node, and
   wherein the first node transmits data during an interval after receiving the polling signal identifying the first node.

2. The method of claim 1, further comprising:
   reserving a time slot in a polling cycle for the first node when the QoS link can be supported.

3. The method of claim 2, further comprising:
   broadcasting a polling signal identifying the first node; and
   transmitting data, by the first node, during an interval after the polling signal is broadcast.

4. The method of claim 3, further comprising:
   withholding transmission by at least one other node during the interval after the polling signal is broadcast.

5. The method of claim 1, further comprising:
   sending a deny message to the first node when the QoS link cannot be supported.

6. The method of claim 1, wherein the determining includes:
   forwarding the request to at least one other node, the other node being the second node or a next hop in a path to the second node, and
   determining, by the at least one other node, whether the QoS link can be supported.

7. The method of claim 1, wherein a path from the first node to the second node includes a number of nodes, and wherein the determining includes:
   forwarding the request to each of the nodes in the path and to the second node,
   determining, by each of the nodes in the path, whether the QoS link can be supported,
   determining, by the second node, whether the QoS link can be supported, and
   generating, by the third node, an accept message when each of the nodes in the path and the second node can support the QoS link.

8. The method of claim 1, further comprising:
   repeating the broadcasting over a period of time.

9. The method of claim 1, further comprising:
   modifying the polling cycle in response to QoS release messages and requests for additional QoS links.

10. A first node, comprising:
    a receiver configured to receive a request from a second node, the request including information indicating that the second node requires a QoS link to a third node;
    a processing device configured to:
       determine whether the QoS link from the second node to the third node can be supported,
       generate a polling cycle, and
       reserve a time slot for the second node in the polling cycle when the QoS link can be supported; and
    a transmitter configured to transmit an accept message to the second node when the QoS link can be supported;
    wherein when determining whether the QoS link from the second node to the third node can be supported, the processing device is configured to:
    generate a deny message when the QoS link cannot be supported by each node in a path from the second node to the third node, and
    the transmitter is configured to transmit the deny message to the second node.

11. The first node of claim 10, wherein the processing device is further configured to:
broadcast a polling signal via the transmitter, the polling signal identifying the second node at the time slot reserved for the second node, and wherein
the receiver is configured to receive data from the second node in an interval immediately following the broadcast of the polling signal.

12. The first node of claim 11, wherein the processing device is further configured to:
forward the data, via the transmitter, to the third node or to a next hop in a path to the third node.

13. The first node of claim 10, wherein the processing device is further configured to:
generate a deny message when the QoS link cannot be supported by each node in a path from the second node to the third node, and
the transmitter is configured to transmit the deny message to the second node.

14. The first node of claim 10, wherein the polling cycle identifies a number of nodes based on requests for QoS links and determinations that the requests for QoS links can be supported, and wherein the processing device is further configured to:
reserve a time slot in the polling cycle for each of the nodes that requests a QoS link that can be supported.

15. The first node of claim 14, wherein the transmitter is further configured to:
broadcast polling signals, each of the polling signals identifying a particular node based on the polling cycle.

16. A computer-readable medium having stored thereon a plurality of sequences of instructions which, when executed by a processor, cause said processor to:
receive a request from a first node, the request including information indicating that the first node requires a QoS link to a second node;
determine whether the QoS link from the first node to the second node can be supported;
generate a polling cycle;
reserve a time slot for the first node in the polling cycle when the QoS link can be supported; and
transmit an accept message to the first node when the QoS link can be supported;
wherein when determining whether the QoS link from the first node to the second node can be supported, the instructions cause the processor to:
identify at least one other node based on the request, the other node being the second node or a next hop in a path to the second node,
forward the request to the other node, and
receive a response from the other node indicating whether the QoS link can be supported;
wherein the polling cycle identifies a number of nodes based on requests for QoS links and determinations that the requests for QoS links can be supported, and wherein the instruction further cause the processor to:
reserve a time slot in the polling cycle for each node that requests a QoS link that can be supported; and
broadcast polling signals, each polling signal identifying a particular node based on the polling cycle.

17. The computer-readable medium of claim 16, including instructions for causing said processor to:
broadcast a polling signal identifying the first node at the time slot reserved for the first node; and
receive data from the first node in an interval immediately following the broadcast of the polling signal.

18. The computer-readable medium of claim 17, including instructions for causing said processor to:
forward the data to the second node or to a next hop in a path to the second node.

19. The computer-readable medium of claim 16, including instructions for causing said processor to:
generate a deny message when the QoS link cannot be supported by each node in a path from the first node to the second node; and
transmit the deny message to the first node.

20. A first node, comprising:
processing logic configured to generate a request, the request indicating that the first node requires a QoS link to a second node;
a transmitter configured to transmit the request to a third node, the third node representing a manager node for a number of nodes including the first node; and
a receiver configured to receive at least one of an accept message and a deny message from the third node, the accept message indicating that the QoS link can be supported and the deny message indicating that the QoS link cannot be supported;
wherein the receiver is further configured to:
receive a polling signal from the third node, the polling signal identifying the first node, and wherein the transmitter is further configured to transmit data in response to the polling signal;
a memory configured to store network configuration information, and
wherein the processing logic is further configured to:
access the memory to determine whether the second node is one hop away from the first node.

21. The first node of claim 20, wherein the transmitter is further configured to:
transmit the data directly to the second node when the second node is one hop away.

22. The first node of claim 20, wherein the transmitter is further configured to:
transmit the data to the third node when the second node is not one hop away.

23. The first node of claim 20, wherein the receiver is further configured to:
receive a polling signal from the third node, the polling signal identifying a node other than the first node, and
wherein the transmitter is further configured to withhold transmission of data for an interval of time following the receipt of the polling signal identifying a node other than the first node.

24. A computer-readable medium having stored thereon a plurality of sequences of instructions, said instructions which, when executed by a processor, cause said processor to:
generate a request indicating that a first node requires a QoS link to a second node, the first node being associated with the processor;
transmit the request to a third node, the third node representing a manager node for a number of nodes including the first node; and
receive at least one of an accept message and a deny message from the third node, the accept message indicating that the QoS link can be supported and the deny message indicating that the QoS message cannot be supported;
receive a polling signal from the third node;
determine that the polling signal identifies the first node; and
transmit data in response to the polling signal.

25. The computer-readable medium of claim 24, including instructions for causing the processor to:
  determine whether the second node is one hop away from the first node; and when transmitting data in response to the polling signal, the instructions cause the processor to:
  transmit the data directly to the second node when the second node is one hop away, and
  transmit the data to the third node when the second node is not one hop away.

26. The computer-readable medium of claim 24, including instructions for causing the processor to:
  receive a polling signal from the third node;
  determine that the polling signal identifies a node other than the first node; and
  withhold transmission of data for an interval of time following the receipt of the polling signal identifying a node other than the first node.

27. A system for controlling access to a communication channel in a wireless network, comprising:
  means for receiving requests from a plurality of nodes, each of the requests including information identifying a QoS link;
  means for determining whether the QoS link identified in each of the respective requests can be supported;
  means for generating a polling cycle identifying QoS links that can be supported;
  means for broadcast polling signals based on the polling cycle; and
  means for receiving data from a node identified in a polling signal in an interval immediately following the polling signal.

28. A method for accessing a shared communication medium comprising:
  broadcasting a message from a first node to a plurality of nodes via the shared communication medium, the message identifying a link that the first node wishes to establish with a second node and including a priority associated with the link;
  receiving the message at each of the plurality of nodes; and
  adjusting, by the first node, a contention window interval based on the priority included in the message;
  adjusting, by the second node, a contention window interval based on the priority included in the message;
  adjusting the contention window interval to decrease the duration of the contention window interval when the priority associated with the link is high.

29. The method of claim 28, wherein the contention window interval defines an interval of time in which the first and second nodes cannot contend for the shared communication medium after expiration of a predetermined interval.

30. The method of claim 28, further comprising:
  generating, by the first node, a release message;
  broadcasting the release message; and
  adjusting, by the first and second nodes, their respective contention window intervals back to a predetermined interval.

31. The method of claim 28, further comprising:
  adjusting, by at least one node other than the first and second nodes, a contention window interval based on the priority included in the message.

32. The method of claim 31, wherein the adjusting by the at least one other node includes:
  increasing the contention window interval when the priority included in the message is high.

33. A first node, comprising:
  a processing device configured to:
    generate a request that indicates that the first node wishes to establish a link over a shared communication medium with a second node, the request including a priority associated with the link, and
    adjust a contention window interval based on the priority included in the request; and
  a transmitter configured to broadcast the request to a number of nodes including the second node;
  wherein the contention window interval defines an interval of time during which the first node cannot contend for the shared communication medium after expiration of a predetermined interval and when adjusting the contention window interval, the processing device is configured to:
    increase the duration of the contention window interval when the priority associated with the link is low.

34. The first node of claim 33, wherein when adjusting the contention window interval, the processing device is configured to:
  decrease the duration of the contention window interval when the priority associated with the link is high.

35. The first node of claim 33, wherein the processing device is further configured to:
  generate a release message, the release message indicating that the link is no longer needed,
  broadcast the release message via the transmitter, and
  adjust the contention window interval back to a predetermined interval.

36. The first node of claim 33, wherein the link comprises a QoS link.

37. A computer-readable medium having stored thereon a plurality of sequences of instructions, said instructions which, when executed by a processor, cause said processor to:
  generate a request, the request indicating that a first node wishes to establish a link over a shared communication medium with a second node, the processor being associated with the first node and the request including a priority associated with the link;
  adjust a contention window interval based on the priority included in the request; and
  broadcast the request to a number of nodes including the second node;
  wherein when adjusting the contention window interval, the instructions cause the processor to:
    decrease the duration of the contention window interval when the priority associated with the link is high.

38. The computer-readable medium of claim 37, wherein the contention window interval defines an interval of time during which the processor cannot contend for the shared communication medium after expiration of a predetermined interval and when adjusting the contention window interval, the instructions cause the processor to:
  increase the duration of the contention window interval when the priority associated with the link is low.

39. The computer-readable medium of claim 37, including instructions for causing the processor to:
  generate a release message when the link from the first node to the second node is no longer needed;
  broadcast the release message; and
  adjust the contention window interval back to a predetermined interval.

40. The computer-readable medium of claim 37, wherein the link comprises a QoS link.

41. A first node, comprising:
a receiver configured to receive a broadcast message from a second node; and
a processing device configured to:
determine that the broadcast message indicates that the second node wishes to establish a link over a shared communication medium,
identify a priority associated with the link, and
adjust a contention window interval based on the priority;
wherein the receiver is further configured to receive a release message indicating that the link is no longer needed, and
the processing device is further configured to adjust the contention window interval to a predetermined interval in response to the release message.

42. The first node of claim 41, wherein when adjusting the contention window interval, the processing device is configured to:
increase the duration of the contention window interval when the priority associated with the link is high.

43. The first node of claim 41, wherein the contention window interval defines an interval of time during which the first node cannot contend for the shared communication medium after expiration of a predetermined interval and when adjusting the contention window interval, the processing device is configured to:
decrease the duration of the contention window interval when the priority associated with the link is low.

44. The first node of claim 41, wherein the link comprises a QoS link.

45. A computer-readable medium having stored thereon a plurality of sequences of instructions, said instructions which, when executed by a processor, cause said processor to:
receive a broadcast message from a first node;
determine that the broadcast message indicates that the first node wishes to establish a link with a second node over a shared communication medium, wherein the first and second nodes are not associated with the processor;
identify a priority associated with the link; and
adjust a contention window interval based on the priority;
wherein the contention window interval defines an interval of time during which the processor cannot contend for the shared communication medium after expiration of a predetermined interval and when adjusting the contention window interval, the instructions cause the processor to:
decrease the duration of the contention window interval when the priority associated with the link is low.

46. The computer-readable medium of claim 45, wherein when adjusting the contention window interval, the instructions cause the processor to:
increase the duration of the contention window interval when the priority associated with the link is high.

47. The computer-readable medium of claim 45, wherein the instructions further cause the processor to:
receive a release message indicating that the link is no longer needed; and
adjust the contention window interval to a predetermined interval in response to the release message.

48. The computer-readable medium of claim 45, wherein the link comprises a QoS link.

49. A method for accessing a shared communication medium by a number of nodes, a first group of nodes being neighbors with a manager node and a second group of nodes being neighbors with each other, the method comprising:
generating a request at a first node in the first group of nodes, the request including information indicating that the first node requires a link to a second node;
transmitting the request from the first node to the manager node;
determining, by the manager node, whether the link from the first node to the second node can be supported;
sending an accept message from the manager node to the first node when the link can be supported;
broadcasting a message from a third node in the second group of nodes, the message identifying a link that the third node wishes to establish with another node in the second group of nodes and including a priority associated with the link;
receiving the message at each of the nodes in the second group of nodes; and
adjusting, by the third node, a contention window interval based on the priority included in the message.

* * * * *